Dec. 9, 1924.
A. O. EDWARDS
PIE AND CAKE PAN
Filed Feb. 13, 1924
1,518,973
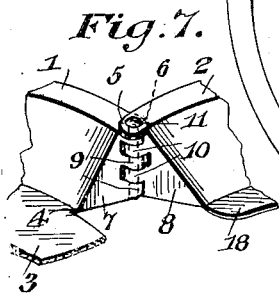
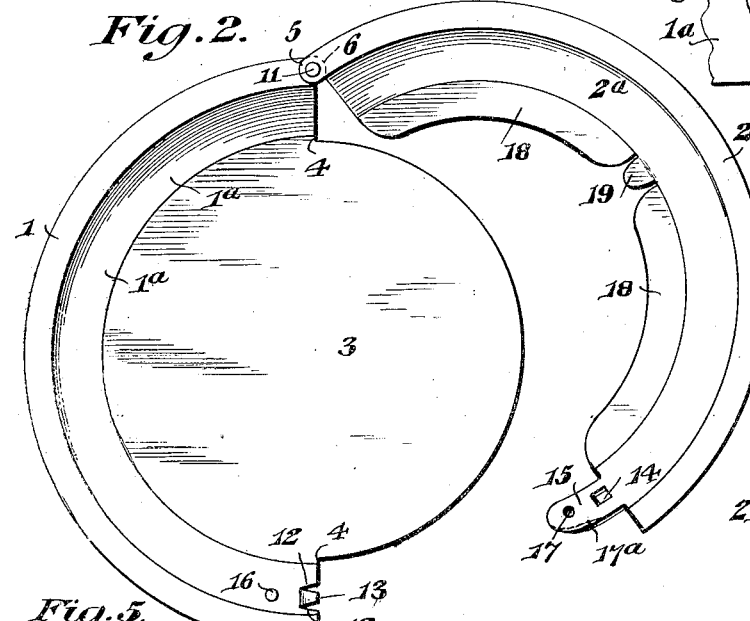
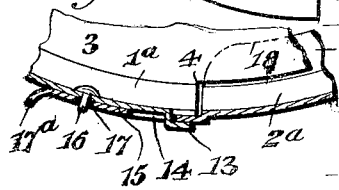
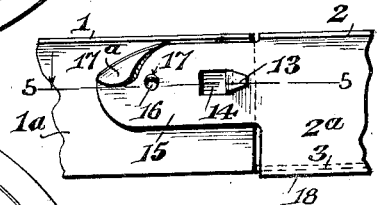
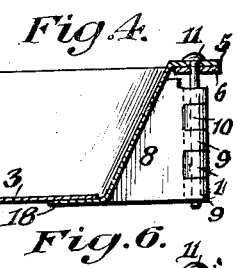
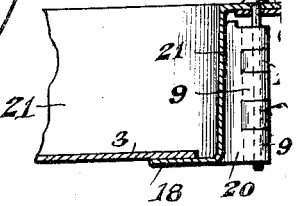
August O. Edwards, INVENTOR.
BY Geo. P. Kimmel, ATTORNEY.

Patented Dec. 9, 1924.

1,518,973

UNITED STATES PATENT OFFICE.

AUGUST OTTO EDWARDS, OF HUNTINGTON BEACH, CALIFORNIA.

PIE AND CAKE PAN.

Application filed February 13, 1924. Serial No. 692,541.

*To all whom it may concern:*

Be it known that I, AUGUST OTTO EDWARDS, a citizen of the United States, residing at Huntington Beach, in the county of Orange and State of California, have invented certain new and useful Improvements in Pie and Cake Pans, of which the following is a specification.

This invention relates to pie and cake pans and has for its primary object the provision, in a manner as hereinafter set forth, of a pan so constructed that a portion of the pan rim may be swung away from the bottom of the pan to facilitate the removal of the cake or pie therefrom.

A further object of this invention is the provision, in a manner as hereinafter set forth, of a separable cake and pie pan so constructed that the parts will securely lock together when the pan is ready to receive material to be baked therein, and when the material is to be removed from the pan one-half of the rim may be readily disconnected from the rest of the pan and swung outwardly therefrom to allow for the removal of the cake or pie with the least amount of trouble.

The final object of the invention is the provision, in a manner as hereinafter set forth, of a separable cake and pie pan of neat construction, efficient, strong, durable, and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 1 is a top plan view of the device embodying this invention.

Figure 2 is a top plan view of the same shown in partially opened position.

Figure 3 is a detail view showing the latching means by which the parts are connected together.

Figure 4 is a detail view taken upon the line 4—4 of Figure 1 showing the hinge construction of a vessel of the pie pan type which has sharpened sloping sides.

Figure 5 is a sectional view taken upon the line 5—5 of Figure 3 showing the relation of the parts of the latch mechanism.

Figure 6 is a sectional view similar to Figure 4 showing the hinge construction as applied to a pan having straight sides as in cake pans.

Figure 7 is a detail view of the hinge construction between the parts.

Referring now to the drawings in detail wherein like numerals of reference indicate corresponding parts throughout the several views shown, there is shown a pan of the pie pan type having its rim divided into two portions 1 and 2 respectively, the portion 1 having the bottom 3 formed integral therewith. The bottom 3 is cut in at the diametrically opposite points 4 thus making the outer or free side of the bottom of shorter radii than the inner side. The rims 1 and 2 are each extended slightly beyond the sides $1^a$ and $2^a$ at one side of the pan to form the overlapping ears 5 and 6, and the sides $1^a$ and $2^a$ at their ends beneath the ears 5 and 6 are turned outwardly at right angles to form the hinge sections 7 and 8, each section having its vertical edge formed to provide the hinge knuckles 9 and 10, which are interlocked and have extended therethrough the vertical pivot pins 11. The other end of the side $1^a$ has formed in its edge two inwardly extending V-shaped cuts 12, thus forming a tongue 13 adapted, when the sides are brought together to extend through the aperture 14 formed in the outwardly extending catch finger 15 which is formed integral with and extends outwardly from the other end of the other side $2^a$. This tongue 13 enters the aperture 14 from the inside and lies against the outer side of the finger when the parts are in closed position. Positioned behind the tongue 13 in the side $1^a$ is a pin 16 which extends outwardly from the outer side of the side $1^a$ and is engaged by the aperture 17 in the free end of the finger 15 when the parts are closed to lock the parts in closed position. The upper edge of the finger 15 at its outer end is turned over as at $17^a$ so that the latch finger 15 may be more easily grasped when it is desired to disconnect the finger from the pin 16.

Extending inwardly around the lower edge of the side $2^a$ are a pair of inwardly extending flanges 18 separated at their inner or meeting ends by a free inwardly extending tongue 19. When the pan sections are brought together the outer or free side of the bottom 3 rides up over the flanges 18 and beneath the tongue 19 as is clearly shown in Figure 1 of the drawings and at the same time the tongue 13 slides over the inner surface of the finger 15 and projects itself through the aperture 14 therein while the aperture 17 in the finger 15 engages itself over the lug 16 thus locking the sections securely together.

In the hinge construction shown in Figure 6 the part 20 corresponds to the part 8 in Figure 4, only as shown, the pan sides 21 are substantially vertical instead of inclined as shown in Figure 4.

Having thus described my invention what I claim is:

1. A pan having its side formed in two sections, a bottom formed integral with one of said sections, a pair of alined spaced inwardly extending flanges at the lower edge of the other section and adapted to engage the bottom at its underside to support the same, a resilient tongue between said spaced flanges adapted to frictionally engage said bottom at its top side, a hinge connection between the sections, and resilient fastening means carried by each section and engaging the adjacent section when the free ends of the two sections are brought together.

2. In a pan having an inclined side, two semi-circular side sections, a substantially circular bottom formed integral with one of said sections and adapted to engage the other section, a triangularly shaped lateral extension formed integral with and projecting outwardly from one end of each section, each extension being formed along its outer vertical edge with means to provide hinge knuckles, a pivot pin securing the knuckles of the extension of each section together, and a resilient fastening means carried by each section and engaging the adjacent section when the free ends of the two sections are brought together.

3. In a pan, two semi-circular side sections, a substantially circular bottom formed integral with one of said sections, a pair of spaced alined inwardly extending flanges at the lower edge of the other section adapted to frictionally engage said bottom at its underside, a resilient inwardly extending tongue between said spaced flanges adapted to frictionally engage said bottom at its top side, a hinge connection between the two ends of said sections, a resilient extension at the free end of one section having a pair of apertures therethrough, a tongue formed at the free end of the other extension, and a pin in said section rearwardly of said tongue, said tongue adapted to engage said extension in one of said apertures and said pin adapted to engage in the other of said apertures to lock the sections when the free ends are brought together.

In testimony whereof, I affix my signature hereto.

AUGUST OTTO EDWARDS.